(12) United States Patent
Zhou et al.

(10) Patent No.: US 8,961,826 B2
(45) Date of Patent: Feb. 24, 2015

(54) OXIDE STANNATE LUMINESCENT MATERIAL AND PREPARATION METHOD THEREOF

(75) Inventors: Mingjie Zhou, Guangdong (CN); Xiaofang Liang, Guangdong (CN); Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 0 days.

(21) Appl. No.: 13/702,151

(22) PCT Filed: Jun. 9, 2010

(86) PCT No.: PCT/CN2010/073720
§ 371 (c)(1),
(2), (4) Date: Dec. 5, 2012

(87) PCT Pub. No.: WO2011/153692
PCT Pub. Date: Dec. 15, 2011

(65) Prior Publication Data
US 2013/0075656 A1    Mar. 28, 2013

(51) Int. Cl.
*C09K 11/66* (2006.01)
*C09K 11/77* (2006.01)

(52) U.S. Cl.
CPC .................. *C09K 11/7787* (2013.01)
USPC ................................. 252/301.4 F

(58) Field of Classification Search
USPC ..................... 252/301.4 F, 301.4 R
See application file for complete search history.

(56) References Cited

U.S. PATENT DOCUMENTS

| | | | | |
|---|---|---|---|---|
| 3,639,252 | A | * | 2/1972 | Riedel et al. ............ 252/301.4 F |
| 2010/0248932 | A1 | * | 9/2010 | Menke et al. ................. 501/103 |

FOREIGN PATENT DOCUMENTS

| | | | | |
|---|---|---|---|---|
| CN | 1951822 | A | * | 4/2007 |
| JP | S49-3914 | B1 | | 1/1974 |
| JP | 56104989 | A | * | 8/1981 |
| JP | 556104989 | A | | 8/1981 |
| JP | S56-104989 | A | | 8/1981 |

OTHER PUBLICATIONS

Fujihara et al., "Multiband Orange-Red Luminescence of Eu3+ Ions Based on the Pyrochlore-Structured Host Crystal", Oct. 8, 2005, Chem. Mater, vol. 17, pp. 5587-5593.*
Hirayama et al., "Relationship between structural characteristics and photoluminescent properties of (La1-xEux)2M2O7 (M = Zr, Hf, Sn) pyrochlores", 2008, Journal of Luminescence, vol. 128, pp. 1819-1825.*
EIC STIC search report Nov. 26, 2013.*
Zhu et al. "Hydrothermal synthesis and Photoluminescence Properties of La2-xEuxSn2O7 (x=0-2.0) Nanocrystals", 2007, J. Am. Ceram. Soc, 90 [10], pp. 3095-3098.*
Wang et al., "Synthesis and luminescence properties of La2-xRExSn2O7 (Re = Eu and Dy) phosphor nanoparticles", 2006, Materials Science and Engineering B, vol. 133, pp. 231-234.*
Bao-Juan et al., "Subsolidus phase relations in the Y2O3-Eu2O3-SnO2 ternary system and their luminescent properties", cta Physica Sinica, vol. 56, No. 12, Dec. 2007, pp. 7147-7151.*
translation of Bao-Juan article, received Aug. 2014.*
Shinobu Fujihara and Kazuaki Tokumo, Multiband Orange-Red Luminescence of Eu3+ Ions Based on the Pyrochlore-Structured Host Crystal,Chem. Mater, 2005, 5587-5593.
Y2O3-Eu2O3-SnO2, Acta Physica Sinica, vol. 56, No. 12, Dec. 2007.
First Office Action for corresponding Chinese Patent Application dated Oct. 8, 2013.
Fujihara, et al; "Multiband Orange-Red Luminescence of Eu3+ Ions Based on the Pyrochlore-Structured Host Crystal"; Chemistry of Materials; 2005 17 (22), pp. 5587-5593.
Hirayama, et al.; "Relationship between structural characteristics and photoluminescent properties of (La1-xEux) 2M2O7 (M=Zr, Hf, Sn) pyrochlores"; Journal of Luminescence; vol. 128, #11, Nov. 2008, pp. 1819-1825.
Wang, et al.; "Synthesis and luminescence properties of La2-xRExSn2O7 (Re = Eu and Dy) phosphor nanoparticles"; Materials Science and Engineering: B; vol. 133, #1-3, Aug. 25, 2006, pp. 231-234.
Communication From the Japanese Patent Office Regarding a Counterpart Foreign Application Dated (Emperor Year 26) Jun. 6, 2014.

* cited by examiner

*Primary Examiner* — Carol M Koslow
*Assistant Examiner* — Lynne Edmondson
(74) *Attorney, Agent, or Firm* — Rosenberg, Klein & Lee

(57) ABSTRACT

A luminescent material and a preparation method thereof are provided. The said luminescent material is represented by the following chemical formula: $Ln_{2-x}Eu_xSn_2O_7$, wherein Ln is selected from one of Gd, Y and La, $0.1 \leq x \leq 1.5$. The said luminescent material has good electrical performance, anti-electron bombardment and stable luminescent property. It is appropriate to be used in field emission light-emitting devices. The said preparation method has simple technique, no pollution, manageable process conditions, low preparation temperature and low equipment requirement, and is beneficial to industry production.

6 Claims, 1 Drawing Sheet

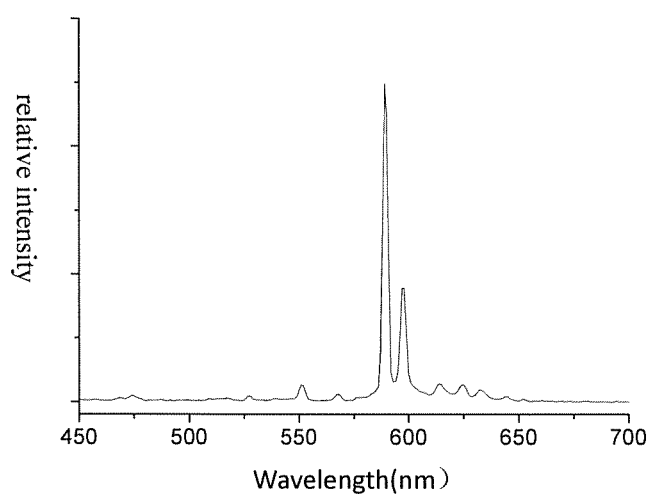

OXIDE STANNATE LUMINESCENT MATERIAL AND PREPARATION METHOD THEREOF

FIELD OF THE INVENTION

The present invention relates to the fields of luminescent materials and lighting technology, more particularly, relates to an oxide stannate luminescent material and the preparation method thereof.

BACKGROUND OF THE INVENTION

FED (Field Emission Device) is attracting special attention as to its superiorities of low working voltage (200-5000V), low power consumption, and high luminance. The principal of FED is similar with CRT (Cathode Ray Tube), which emitting light by E-beam bombardment phosphors on the displayers, and the phosphors having two classes: sulfide phosphor and oxide phosphor. Sulfide phosphor has higher luminance but with bad stability, it is easy to decompose sulfur by the bombardment of low voltage and heavy current E-beam, and the decomposed sulfur not only decreasing the function of the luminescent material itself, but also harmful to the cathode emitter pin. As oxide phosphor has higher stability, studying on the oxide phosphors will has more practical value.

Stannate $Ln_2Sn_2O_7$ is an important lanthanide pyrochlore structured material for its good chemical stability, and is widely used in the field of piezoelectric-dielectrics. With the improvement of preparation method, the feature of nano-structure of stannate $Ln_2Sn_2O_7$ is studied in the field of nano-optoelectronic devices more and more. And it is reported that stannate material $Ln_2Sn_2O_7:Eu^{3+}$ can be used as red phosphor after being UV excited. However, even stannate materials have good electrical characteristics, and have the opportunity be used as FED, the study on this application is still rare.

SUMMARY OF THE INVENTION

According to this background, it is necessary to provide a stannate material with good lighting stability and can be used as FED.

An oxide stannate luminescent material, which is represented by the following chemical formula: $Ln_{2-x}Eu_xSn_2O_7$, wherein Ln is a metal selected from the group consisting of Gd, Y and La, and the scope of x is: $0.1 \leq x \leq 1.5$.

The above-mentioned oxide stannate luminescent material can be used as red phosphor material of FED, due to its good electrical characteristics and excellent bombardment resistance.

In addition, it is necessary to provide a preparation method of this oxide stannate luminescent material with good lighting stability.

A preparation method of oxide stannate luminescent material, comprising the steps of: S1, providing raw materials of Ln compound, Eu compound and Sn compound according to the mole ratio of each element of the chemical formula $Ln_{2-x}Eu_xSn_2O_7$, grinding and uniform mixing to form a mixture; wherein Ln is a metal selected from the group consisting of Gd, Y and La, and the scope of x is: $0.1 \leq x \leq 1.5$; S2, pre-roasting the mixture for 3 to 5 hours under temperature of 300° C. to 500° C., cooling to room-temperature, then grinding into mixing powder; S3, roasting the mixing powder for 1 to 24 hours under temperature of 1200° C. to 1400° C., cooling to room-temperature, grinding, and obtaining the oxide stannate luminescent material.

Preferably, the Ln compound is Ln-Oxide or Ln-Nitrate.
Preferably, the Eu compound is $Eu_2O_3$ or $Eu(NO_3)_3$.
Preferably, the Sn compound is $SnO_2$ or $Sn(OH)_2$.
Preferably, the step S1 further including the step of doping fluxing agent into the raw materials, the amount of the fluxing agent is 1% to 5% of the total mole quantity of all the elements in the oxide stannate luminescent material.
Preferably, the fluxing agent is $H_3BO_3$ or $MgF_2$.

The above-mentioned oxide stannate luminescent material has good electrical characteristics, good chemical stability and excellent bombardment resistance and can be used in the field of FED.

At the same time, the preparation method has advantages of simple technique, no pollution, manageable process conditions, low preparation temperature and low equipment requirement, and with good stability of the manufactured luminescent materials.

By doping fluxing agent into the raw materials, the reaction will be more thoroughly and the reaction temperature is reduced.

BRIEF DESCRIPTION OF THE DRAWINGS

FIG. 1 shows the CL emission spectrum of the prepared luminescent material of the example 2 at the condition of the accelerate voltage being 3 kv.

DETAILED DESCRIPTION

An oxide stannate luminescent material, which is represented by the following chemical formula: $Ln_{2-x}Eu_xSn_2O_7$, wherein Ln is a metal selected from the group consisting of Gd, Y and La, and the scope of x is: $0.1 \leq x \leq 1.5$.

A preparation method of oxide stannate luminescent material is provided also, which comprises the steps of: providing raw materials of Ln compound, Eu compound and Sn compound according to the mole ratio of each element of the chemical formula $Ln_{2-x}Eu_xSn_2O_7$, grinding and uniform mixing to form a mixture; pre-roasting the mixture for 3 to 5 hours under temperature of 300° C. to 500° C., cooling to room-temperature, then grinding into mixing powder; then, roasting the mixing powder for 1 to 24 hours under temperature of 1200° C. to 1400° C., cooling to room-temperature, grinding, and obtaining the oxide stannate luminescent material $Ln_{2-x}Eu_xSn_2O_7$.

Preferably, the steps further including the step of doping fluxing agent into the raw materials, the amount of the fluxing agent is 1% to 5% of the total mole quantity of all the elements in the oxide stannate luminescent material; and the fluxing agent is selected from the group consisting of $H_3BO_3$ and $MgF_2$.

The detailed oxide stannate luminescent material and the preparation method thereof will be described by the following examples.

Example 1

Preparation of Luminescent Material $Gd_{1.8}Eu_{0.2}Sn_2O_7$

Weigh accurately about 0.8156 g $Gd_2O_3$, 0.0880 g $Eu_2O_3$, 0.7535 g $SnO_2$, 0.0077 g $H_3BO_3$ (fluxing agent, the amount is 5% of the total mole quantity of all the elements in the oxide stannate luminescent material; similarly hereinafter) according the stoichiometric ratio. Putting all the materials into agate inquiry bowl and grinding adequately to form a mixture; then introducing the mixture into jade crucible pre-roasting for 4 hours under temperature of 400° C., cooling to room-temperature, and again grinding thoroughly; finally, roasting the grinded powder for 10 hours under temperature of 1200° C., cooling to room-temperature, grinding, and obtaining the red phosphor stannate luminescent material $Gd_{1.8}Eu_{0.2}Sn_2O_7$.

Example 2

Preparation of Luminescent Material $Y_{1.85}Eu_{0.15}Sn_2O_7$

Weigh accurately about 0.5222 g $Y_2O_3$, 0.0660 g $Eu_2O_3$, 0.7535 g $SnO_2$, 0.0077 g fluxing agent $H_3BO_3$ (5%) according the stoichiometric ratio. Putting all the materials into agate inquiry bowl and grinding adequately to form a mixture; then introducing the mixture into jade crucible pre-roasting for 3 hours under temperature of 500° C., cooling to room-temperature, and again grinding thoroughly; finally, roasting the grinded powder for 5 hours under temperature of 1400° C., cooling to room-temperature, grinding, and obtaining the red phosphor stannate luminescent material $Y_{1.85}Eu_{0.15}Sn_2O_7$.

FIG. 1 shows the CL emission spectrum of the prepared stannate luminescent material $Y_{1.85}Eu_{0.15}Sn_2O_7$ at the condition of the accelerate voltage is 3 kv. As in FIG. 1, Eu ion is doped into $Y_2Sn_2O_7$, and atom Eu is position on the symmetrical center site, emitting orange red light around 590 nm wavelength. This kind of materials prepared by high temperature solid-state reaction can be used as FED materials, due to its good chemical stability and cathode luminescence characteristics.

Example 3

Preparation of Luminescent Material $Y_{1.5}Eu_{0.5}Sn_2O_7$

Weigh accurately about 0.4234 g $Y_2O_3$, 0.0440 g $Eu_2O_3$, 0.7636 g $Sn(OH)_2$, 0.0015 g fluxing agent $H_3BO_3$ (1%) according the stoichiometric ratio. Putting all the materials into agate inquiry bowl and grinding adequately to form a mixture; then introducing the mixture into jade crucible pre-roasting for 2 hours under temperature of 500° C., cooling to room-temperature, and again grinding thoroughly; finally, roasting the grinded powder for 5 hours under temperature of 1300° C., cooling to room-temperature, grinding, and obtaining the red phosphor stannate luminescent material $Y_{15}Eu_{0.5}Sn_2O_7$.

Example 4

Preparation of Luminescent Material $Gd_{1.0}Eu_{1.0}Sn_2O_7$

Weigh accurately about 1.1284 g $Gd(NO_3)_3 \cdot 6H_2O$, 1.1152 g $Eu(NO_3)_3 \cdot 6H_2O$, 0.7535 g $SnO_2$, 0.0031 g fluxing agent $MgF_2$ (2%) according the stoichiometric ratio. Putting all the materials into agate inquiry bowl and grinding adequately to form a mixture; then introducing the mixture into jade crucible pre-roasting for 5 hours under temperature of 300° C., cooling to room-temperature, and again grinding thoroughly; finally, roasting the grinded powder for 24 hours under temperature of 1300° C., cooling to room-temperature, grinding, and obtaining the red phosphor stannate luminescent material $Gd_{1.0}Eu_{1.0}Sn_2O_7$.

Example 5

Preparation of Luminescent Material $La_{0.5}Eu_{1.5}Sn_2O_7$

Weigh accurately about 0.2036 g $La_2O_3$, 1.6728 g $Eu(NO_3)_3 \cdot 6H_2O$, 0.7535 g $SnO_2$, 0.0046 g fluxing agent $H_3BO_3$ (3%) according the stoichiometric ratio. Putting all the materials into agate inquiry bowl and grinding adequately to form a mixture; then introducing the mixture into jade crucible pre-roasting for 5 hours under temperature of 500° C., cooling to room-temperature, and again grinding thoroughly; finally, roasting the grinded powder for 12 hours under temperature of 1200° C., cooling to room-temperature, grinding, and obtaining the red phosphor stannate luminescent material $La_{0.5}Eu_{1.5}Sn_2O_7$.

Example 6

Preparation of Luminescent Material $La_{1.5}Eu_{0.5}Sn_2O_7$

Weigh accurately about 0.6109 g $La_2O_3$, 0.2200 g $Eu_2O_3$, 0.7636 g $Sn(OH)_2$, 0.0046 g fluxing agent $H_3BO_3$ (3%) according the stoichiometric ratio. Putting all the materials into agate inquiry bowl and grinding adequately to form a mixture; then introducing the mixture into jade crucible pre-roasting for 5 hours under temperature of 400° C., cooling to room-temperature, and again grinding thoroughly; finally, roasting the grinded powder for 12 hours under temperature of 1400° C., cooling to room-temperature, grinding, and obtaining the red phosphor stannate luminescent material $La_{1.5}Eu_{0.5}Sn_2O_7$.

The above-mentioned oxide stannate luminescent material can be used in the field of FED, due to its good electrical characteristics, good chemical stability and excellent bombardment resistance.

At the same time, the preparation method has advantages of simple technique, no pollution, manageable process conditions, low preparation temperature and low equipment requirement, and with good stability of the manufactured luminescent materials. The reaction will be more thoroughly and lower preparation temperature by doping fluxing agent into the raw materials.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention

What is claimed is:
1. A preparation method of an oxide stannate luminescent material, comprising:
  S1: providing raw materials of Ln compound, Eu compound and Sn compound according to the mole ratio of each element of in the chemical formula $Ln_{2-x}Eu_xSn_2O_7$, grinding and uniform mixing to form a mixture, wherein Ln is a metal selected from the group consisting of Gd with x ranging from 0.1 to 1.5, and Y and La with x ranging from 0.5 to 1.5;
  S2: pre-roasting the mixture for 3 to 5 hours under temperature ranging from 300° C. to 400° C., cooling to room-temperature, and subsequently to said pre-roasting, grinding into a mixing powder; and
  S3: subsequently to said grinding into the mixing powder, roasting the mixing powder for 1 to 24 hours under temperature of 1200° C. to 1400° C., cooling to room-temperature, grinding, and obtaining the oxide stannate luminescent material.

2. The method according to claim 1, the Ln compound is Ln-oxide or Ln-nitrate.

3. The method according to claim 1, the Eu compound is $Eu_2O_3$ or $Eu(NO_3)_3$.

4. The method according to claim 1, the Sn compound is $SnO_2$ or $Sn(OH)_2$.

5. The method according to claim 1, wherein the step S1 further including the step of adding a fluxing agent into the raw materials, the amount of the fluxing agent is 1% to 5% of the total mole quantity of all the elements in the oxide stannate luminescent material.

6. The method according to claim 5, wherein the fluxing agent is $H_3BO_3$ or $MgF_2$.

* * * * *